(12) United States Patent
Liu et al.

(10) Patent No.: US 8,238,304 B2
(45) Date of Patent: Aug. 7, 2012

(54) APPARATUS AND METHOD FOR CHANNEL RESOURCE DESCRIPTION

(75) Inventors: Jingyuan Liu, Morris Plains, NJ (US); Chenglin Cui, Succasunna, NJ (US); David G. Thuel, Middletown, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 601 days.

(21) Appl. No.: 12/412,814

(22) Filed: Mar. 27, 2009

(65) Prior Publication Data

US 2009/0252111 A1 Oct. 8, 2009

Related U.S. Application Data

(60) Provisional application No. 61/040,793, filed on Mar. 31, 2008.

(51) Int. Cl.
*H04W 4/00* (2009.01)
(52) U.S. Cl. ........................................ 370/330; 370/437
(58) Field of Classification Search .......... 370/328–330, 370/335–339, 341–345, 347–348, 437, 441–443, 370/465, 468, 252, 478
See application file for complete search history.

(56) References Cited

U.S. PATENT DOCUMENTS

| | | | |
|---|---|---|---|
| 5,673,259 A | 9/1997 | Quick, Jr. | |
| 8,004,977 B2 * | 8/2011 | Vitebsky et al. | 370/230 |
| 2005/0201269 A1 * | 9/2005 | Shim et al. | 370/208 |
| 2005/0243939 A1 * | 11/2005 | Jung et al. | 375/260 |
| 2007/0086474 A1 * | 4/2007 | Lee et al. | 370/447 |
| 2007/0206532 A1 * | 9/2007 | Munzner | 370/329 |
| 2008/0025241 A1 | 1/2008 | Bhushan et al. | |
| 2008/0130559 A1 * | 6/2008 | Pi | 370/329 |
| 2008/0151829 A1 * | 6/2008 | Khandekar et al. | 370/329 |
| 2008/0205333 A1 * | 8/2008 | Budianu et al. | 370/329 |
| 2009/0052381 A1 * | 2/2009 | Gorokhov et al. | 370/329 |
| 2009/0135761 A1 * | 5/2009 | Khandekar et al. | 370/328 |
| 2009/0303918 A1 * | 12/2009 | Ma et al. | 370/315 |
| 2010/0031110 A1 * | 2/2010 | Seok et al. | 714/748 |

(Continued)

FOREIGN PATENT DOCUMENTS

RU 2209528 C2 7/2003

(Continued)

OTHER PUBLICATIONS

Written Opinion—PCT/US2009/038713, International Search Authority, European Patent Office, Sep. 24, 2009.

(Continued)

*Primary Examiner* — Chi H. Pham
*Assistant Examiner* — Kevin Mew
(74) *Attorney, Agent, or Firm* — Stanton Braden (57) ABSTRACT

An apparatus and method for describing channel resources comprising allocating channel resources for a plurality of tiles; and determining a description of the channel resources allocated for a tile of the plurality of tiles by performing one or more of the following steps: a) comparing the size of the tile to a tile size threshold ($TH_{size}$) to determine if the size of the tile is small or large; b) comparing the allocation of the channel resources to the tile to an allocation threshold ($TH_{allocation}$) to determine if the allocation of the channel resources is sparse or not sparse; and c) determining if the allocation of the channel resources within the tile is regularly spaced or not regularly spaced.

43 Claims, 8 Drawing Sheets

U.S. PATENT DOCUMENTS

2010/0098020 A1* 4/2010 Kim et al. .................. 370/330
2010/0111031 A1* 5/2010 Kim et al. .................. 370/330

FOREIGN PATENT DOCUMENTS

WO  WO2008018711 A2  2/2008

OTHER PUBLICATIONS

International Search Report—PCT/US2009/038713—International Search Authority—European Patent Office, Sep. 24, 2009.

Sarkar et al., "MIMO in Wireless WAN a the UMB System," Communication Systems Software and Middleware and Workshops, 2008. COMSWARE 2008. 3rd International Conference on, IEEE, Piscataway, NJ, USA, Jan. 6, 2008, pp. 57-64.

Sean McBeath et al.: "Efficient Bitmap Signaling for VoIP in OFDMA," Vehicular Technology Conference, 2007, VTC-2007 IEEE 66th, IEEE, PI, Sep. 1, 2007, pp. 1867-1871.

* cited by examiner

APPARATUS AND METHOD FOR CHANNEL RESOURCE DESCRIPTION

CLAIM OF PRIORITY UNDER 35 U.S.C. §119

The present application for patent claims priority to Provisional Application No. 61/040,793, entitled "Data Structure for Channel Resource Description in Wireless OFDMA Wideband System" filed Mar. 31, 2008, and assigned to the assignee hereof and hereby expressly incorporated by reference herein.

FIELD

This disclosure relates generally to apparatus and methods for channel resource description. More particularly, the disclosure relates to data structure for channel resource description.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output (SISO), multiple-input-single-output (MISO) or a multiple-input-multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point. An access point (AP) is also known as a base station and is the part of the wireless system that allows user access to an access terminal (AT) or mobile station (MS).

SUMMARY

Disclosed is an apparatus and method for channel resource description. According to one aspect, a method for describing channel resources comprising allocating channel resources for a plurality of tiles; and determining a description of the channel resources allocated for a tile of the plurality of tiles by performing one or more of the following steps: a) comparing the size of the tile to a tile size threshold ($TH_{size}$) to determine if the size of the tile is small or large; b) comparing the allocation of the channel resources to the tile to an allocation threshold ($TH_{allocation}$) to determine if the allocation of the channel resources is sparse or not sparse; and c) determining if the allocation of the channel resources within the tile is regularly spaced or not regularly spaced.

According to another aspect, an apparatus for describing channel resources comprising an interface for exchanging information relating to the allocated channel resources; and a processor coupled with a memory storing software codes, wherein the software codes are instructions implemented by the processor to allocate channel resources for a plurality of tiles and to determine a description of the channel resources allocated for a tile of the plurality of tiles by performing one or more of the following steps: i) compare the size of the tile to a tile size threshold ($TH_{size}$) to determine if the size of the tile is small or large; ii) compare the allocation of the channel resources to the tile to an allocation threshold ($TH_{allocation}$) to determine if the allocation of the channel resources is sparse or not sparse; and iii) determine if the allocation of the channel resources within the tile is regularly spaced or not regularly spaced.

According to another aspect, an apparatus for channel resource description comprising means for allocating channel resources for a plurality of tiles; and means for determining a description of the channel resources allocated for a tile of the plurality of tiles by performing one or more of the following steps: a) comparing the size of the tile to a tile size threshold ($TH_{size}$) to determine if the size of the tile is small or large; b) comparing the allocation of the channel resources to the tile to an allocation threshold ($TH_{allocation}$) to determine if the allocation of the channel resources is sparse or not sparse; and c) determining if the allocation of the channel resources within the tile is regularly spaced or not regularly spaced.

According to another aspect, a computer-readable medium having a computer program comprising instructions, which when executed by at least one processor provides channel resource description, the computer program comprising instructions for allocating channel resources for a plurality of tiles; and instructions for determining a description of the channel resources allocated for a tile of the plurality of tiles by performing one or more of the following steps: a) comparing the size of the tile to a tile size threshold ($TH_{size}$) to determine if the size of the tile is small or large; b) comparing the allocation of the channel resources to the tile to an allocation threshold ($TH_{allocation}$) to determine if the allocation of the channel resources is sparse or not sparse; and c) determining if the allocation of the channel resources within the tile is regularly spaced or not regularly spaced.

Advantages of the present disclosure include a way of describing channel resources which is more efficient in terms of memory usage.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. Additionally, one skilled in the art would understand that many examples of radio access technologies employed by various wireless systems, including but not limited to, UMTS, WCDMA, GSM, GSM/GPRS/EDGE, LTE, IS-95, CDMA2000, EVDO or UMB, etc. are applicable to the present disclosure.

Single carrier frequency division multiple access (SC-FDMA), which utilizes single carrier modulation and frequency domain equalization, is a multiple access technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
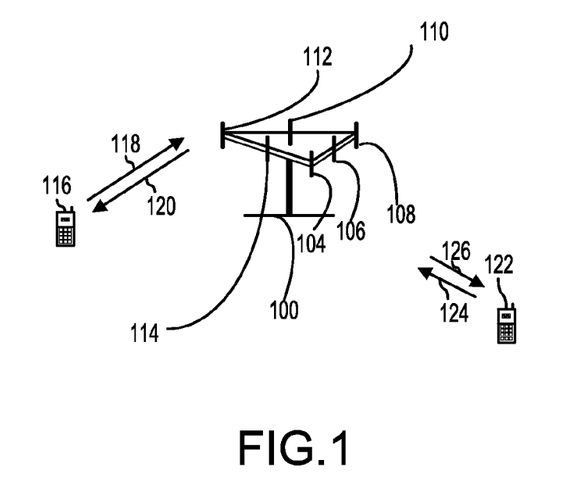
FIG. 1 illustrates an example of a multiple access wireless communication system.

FIG. 1 illustrates an example of a multiple access wireless communication system. As illustrated in FIG. 1, an access point 100 (AP) includes multiple antenna groups, one group including 104 and 106, another group including 108 and 110, and an additional group including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. For example in a frequency division duplex (FDD) system, communication links 118, 120, 124 and 126 use different frequencies in the forward link 120 than those used by reverse link 118.

Each group of antennas and/or the area in which they are designed to communicate is often referred to as a sector of the access point. In one aspect, each antenna groups is designed to communicate to access terminals in a particular sector of the areas covered by access point 100.

In communication over forward links 120 and 126, the transmitting antennas of access point 100 utilize beamforming in order to improve the signal-to-noise ratio (SNR) of forward links for the different access terminals 116 and 124. Also, an access point using beamforming to transmit to access terminals scattered randomly through its coverage causes less interference to access terminals in neighboring cells than an access point transmitting through a single antenna to all its access terminals.

One skilled in the art would understand that although the term access point is used, other equivalent terminology may be used in its place without affecting the spirit or scope of the present disclosure. For example, an access point may be a fixed station used for communicating with the access terminals and may be referred to as a base station, a fixed station, a node or some other similar terminology. Similarly, the term access terminal can equally refer to a mobile terminal, a handheld, user equipment (UE), a wireless communication device, terminal or another similar term without affecting the spirit or scope of the present disclosure.

Figure 2:
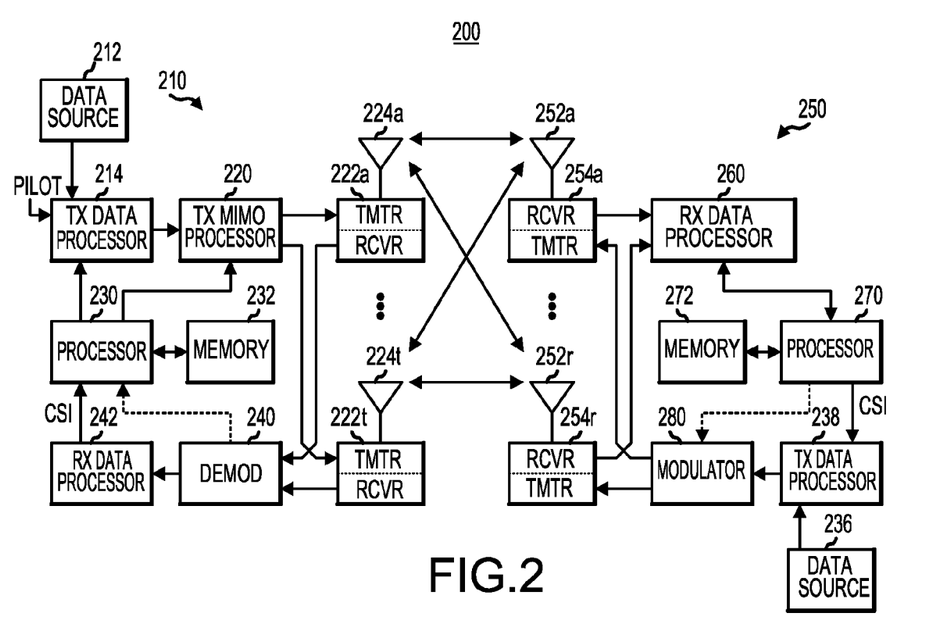
FIG. 2 illustrates an example block diagram of a transmitter system (a.k.a. access point) and a receiver system (a.k.a. access terminal) in a MIMO system.

FIG. 2 illustrates an example block diagram of a transmitter system 210 (a.k.a. access point) and a receiver system 250 (a.k.a. access terminal) in a MIMO system 200. At the transmitter system 210, traffic data for a number of data streams is provided from a data source 212 to a transmit (TX) data processor 214. In one aspect, each data stream is transmitted over a respective transmit antenna. TX data processor 214 formats, codes, and interleaves the traffic data for each data stream based on a particular coding scheme selected for that data stream to provide coded data.

In one aspect, the coded data for each data stream is multiplexed with pilot data using orthogonal frequency division multiplex (OFDM) techniques. The pilot data is typically a known data pattern that is processed in a known manner and is used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream are determined by instructions performed by processor 230.

The modulation symbols for all data streams are then provided to a TX MIMO processor 220, which further process the modulation symbols (e.g., for OFDM). TX MIMO processor 220 then provides $N_T$ modulation symbol streams to $N_T$ transmitters (TMTR) 222a through 222t. In an example, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In one example, orthogonal frequency division multiple access (OFDMA) is used as a multiple access technique in the wireless system. In this scheme, communication resources are divided into discrete units of time and of frequency. For example, time may be divided up into discrete units of size $\Delta t$ and frequency may be divided up into discrete units of size $\Delta f$. In general, a communication resource allocation for OFDMA may consist of a contiguous region of the time-frequency plane known as a tile. A tile may consist of, for example, M time units and N frequency units. In this case, the tile has dimensions of $M\Delta t \times N\Delta f$.

In a communications system, for example, using OFDMA, communication resources allocated to various users may be divided into isolated tiles. In a receiver, each tile may have associated structural information to permit the receiver to extract, for example, known pilot symbols for channel estimation and subsequent demodulation. Tiles may have different shapes or pilot positions, requiring different receive processing. The receiver is provided tile descriptions to enable proper receive processing.

Figure 3:
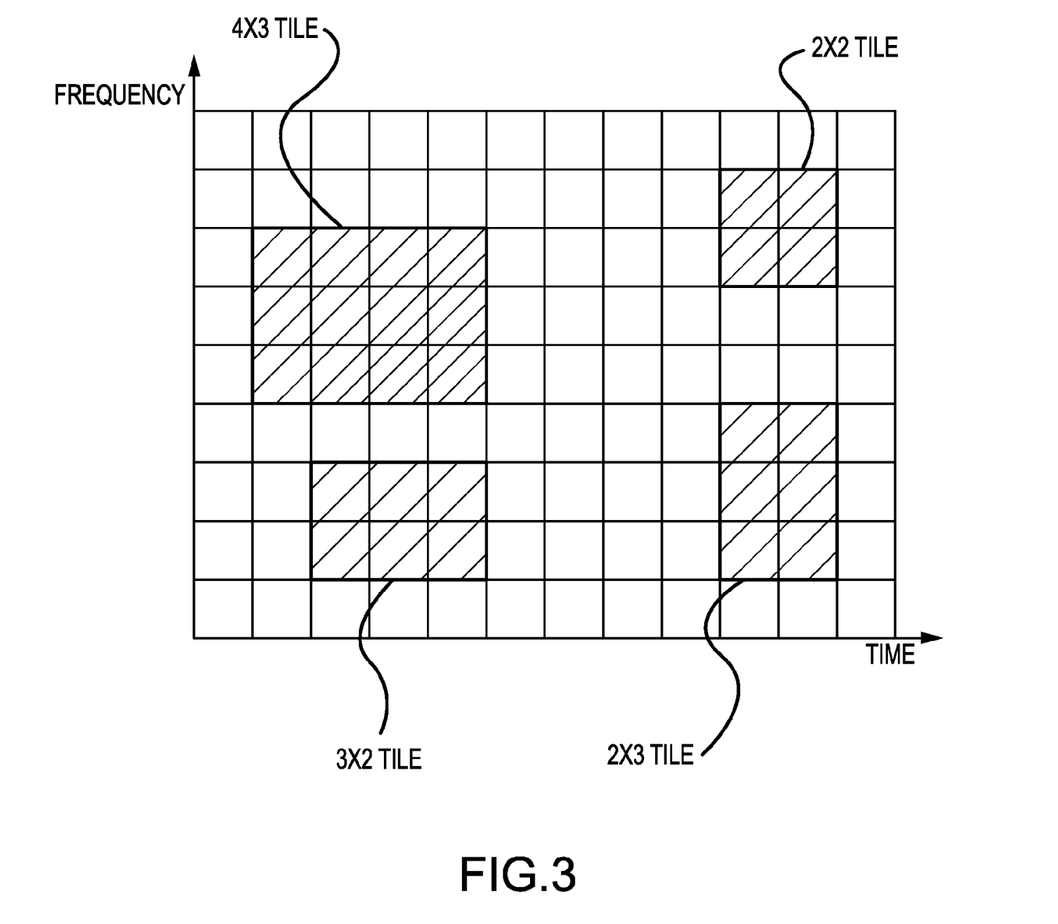
FIG. 3 illustrates examples of tiles in a time-frequency plane.

A resource allocation over the time-frequency plane is known as a tile. In one example, a tile has dimensions of $M\Delta t \times N\Delta f$, where the time unit is $\Delta t$ and frequency unit is $\Delta f$. In one example, the time unit is known as a symbol and the frequency unit is known as a subcarrier. FIG. 3 illustrates examples of tiles in a time-frequency plane. In general, a tile occupies a discrete region in the time-frequency plane and does not overlap with other tiles. Moreover, in one example, tile allocations may vary as a function of time. Special reference signals known as pilots may be assigned to each tile, for example, and may be located within a specific time and frequency unit.

Tiles may have different shapes or pilot positions, requiring different receive processing. However, a reasonable number of tile descriptions may be pre-stored, describing all expected tile formats, and then referenced when needed, for a particular tile, via a job descriptor pointing to that description. Further, receiver processing may be performed on different scales: for example, an "assignment" for a given link, e.g. mobile to base station, may comprise multiple tiles. Once information related to an assignment is supplied to receiver hardware, certain information may be replicated for these multiple tiles in the form of tile job descriptors.

Further, the tiles may be correlated in their locations in frequency or time. For example, in the Ultra Mobile Broadband (UMB) system, time is broken into frames, comprising eight OFDM symbols: within these frames, multiple tiles encompassing regions of eight modulation symbols in time by 16 subcarriers in frequency, are sent at a transmitter. It is efficient to aggregate the receiver processing for such a frame into a job table, containing common parameters that may be needed throughout the frame, as well as pointers to job descriptors which apply to individual tiles within that frame.

Figure 4:
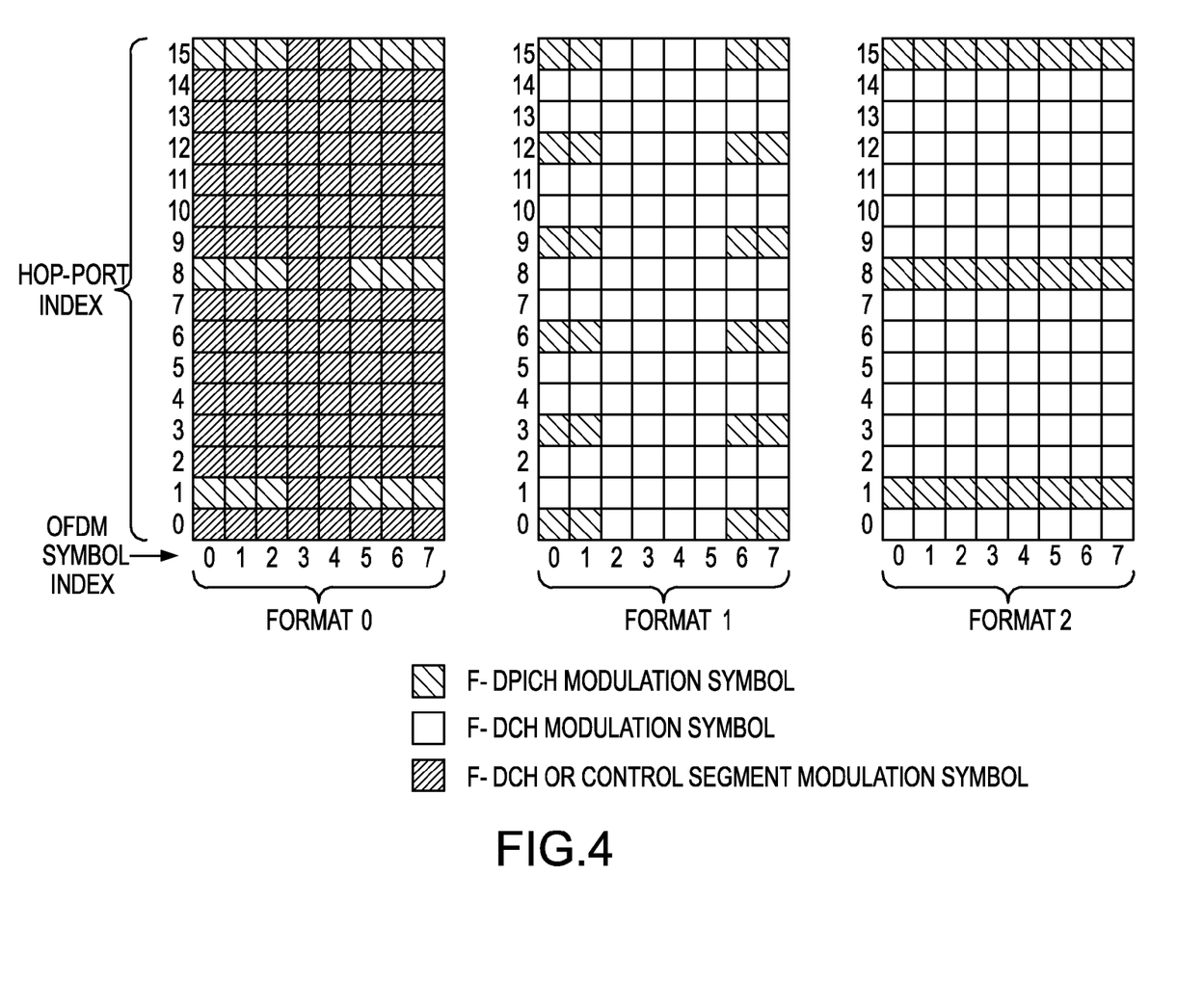
FIGS. 4, 5 and 6 illustrate examples of different channel resource allocations for Ultra Mobile Broadband Forward Link (UMB FL) channels.
Figure 5:
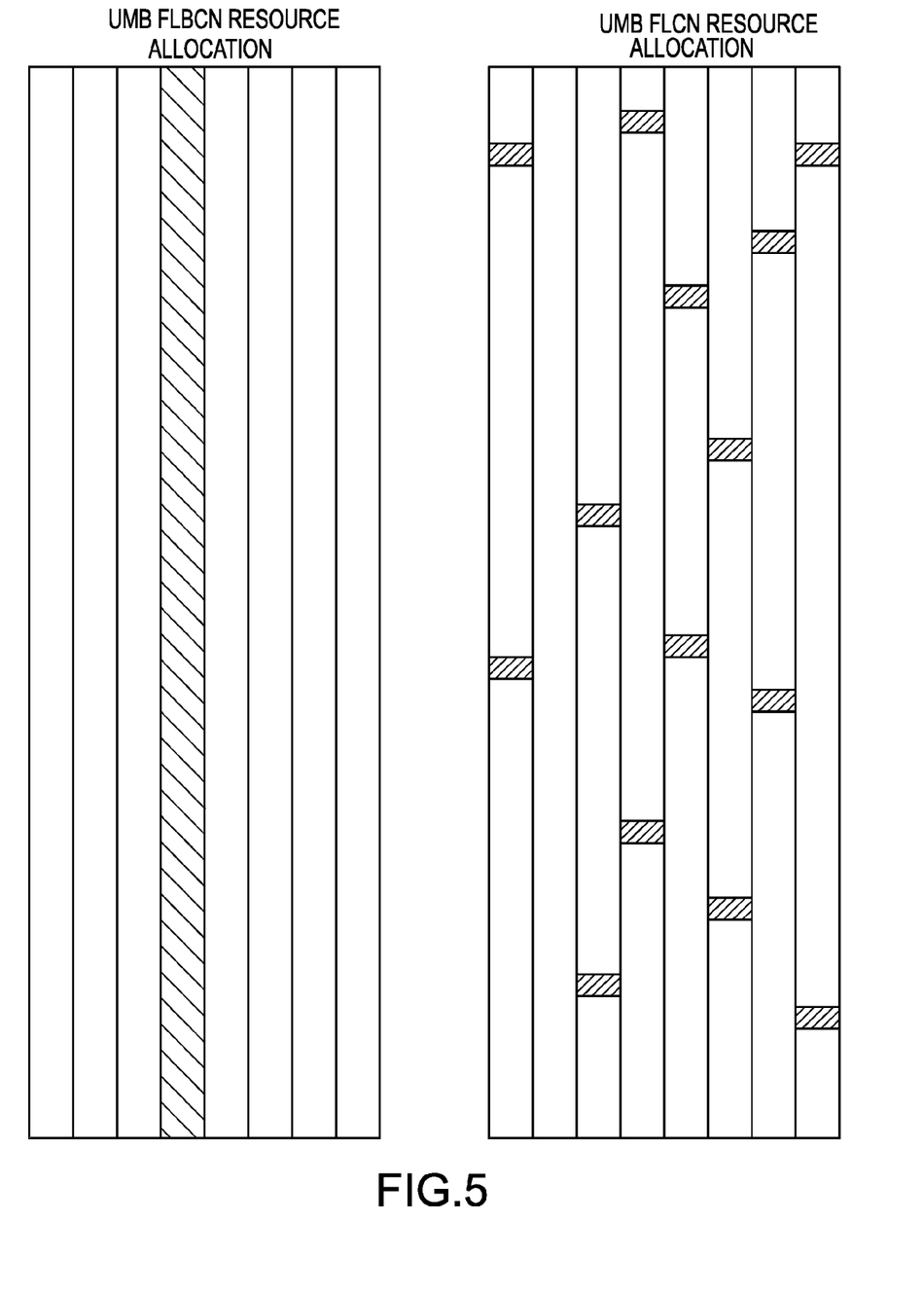
Figure 6:
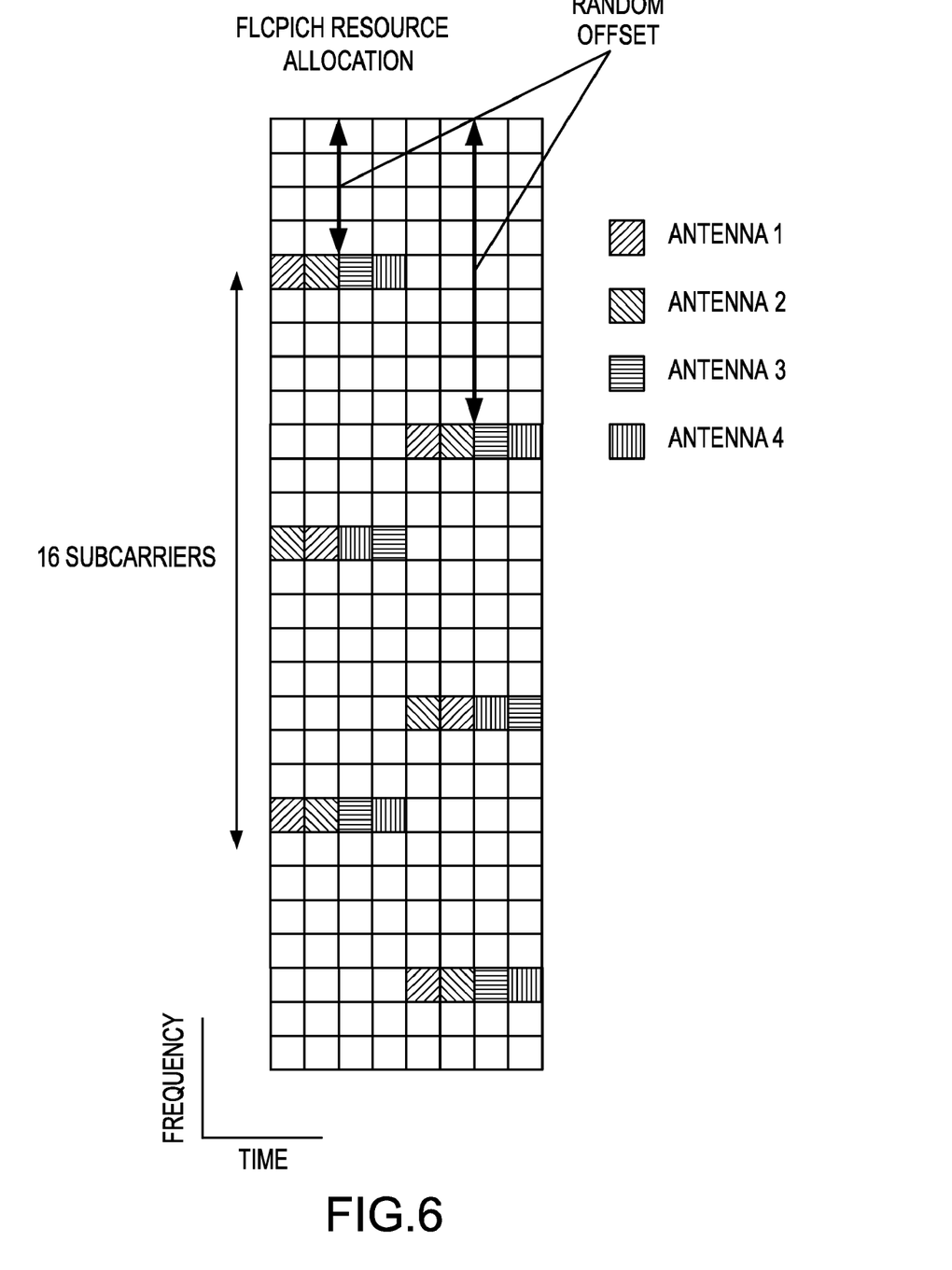

In one aspect, the entire channel resource is divided into blocks or tiles to be used by different channels. The resource allocation for a particular channel within the tile can be arbitrary. FIGS. 4, 5 and 6 illustrate examples of different channel resource allocations for Ultra Mobile Broadband Forward Link (UMB FL) channels. To efficiently handle the arbitrary resource allocation requires a well designed resource description.

The present disclosure discloses an algorithm and data structure to describe arbitrary channel resource allocation within the tiles that provide flexibility through software with emphasis on efficient memory utilization. In one aspect, define a tile as a rectangle in a time-frequency plane with the number of tones in frequency and the number of symbols in time. Use the following to describe the arbitrary shape of resource allocation within the tile:

1. Bitmap: one bit per channel resource (tone/subcarrier) within the tile. A "1" means the channel resource is available to the channel. The total number of bits is equal to the size of the tile (i.e. number of tones by number of symbols). The bitmap is useful when tile size is reasonably small and resource allocation within the tile is not very sparse. An example application is UMB FLDCH (forward link data channel) wherein the tile size is 16 by 8; thus, a 128-bit bitmap is used to describe the channel resource allocated for a channel within the tile.
2. Index: The channel resource description comprises the indices of the allocated tones for each symbol. Index is best suited for channels with very sparse resource allocation within the tile. An example application is a UMB FLCN (forward link cell null) channel which has only 2 tones out of 2048 tones (for a 20 MHz system) allocated in each symbol.
3. Step: In this case, the allocated channel resources within the tile of each symbol are regularly spaced. For example, each symbol within the tile can be described by:

$$t_n = t_0 + K*n,$$

where, $t_n$ is nth tone index in tile allocated to the channel; $t_0$ is the starting tone index; K is the tone spacing; and n is tone index.

The step efficiently describes a large tile with regularly spaced resource allocation. For example, an application is UMB FLCPICH (forward link common pilot channel) which starts at a tone offset varied from symbol to symbol and then spans the entire usable bandwidth with a fixed tone spacing.

Figure 7:
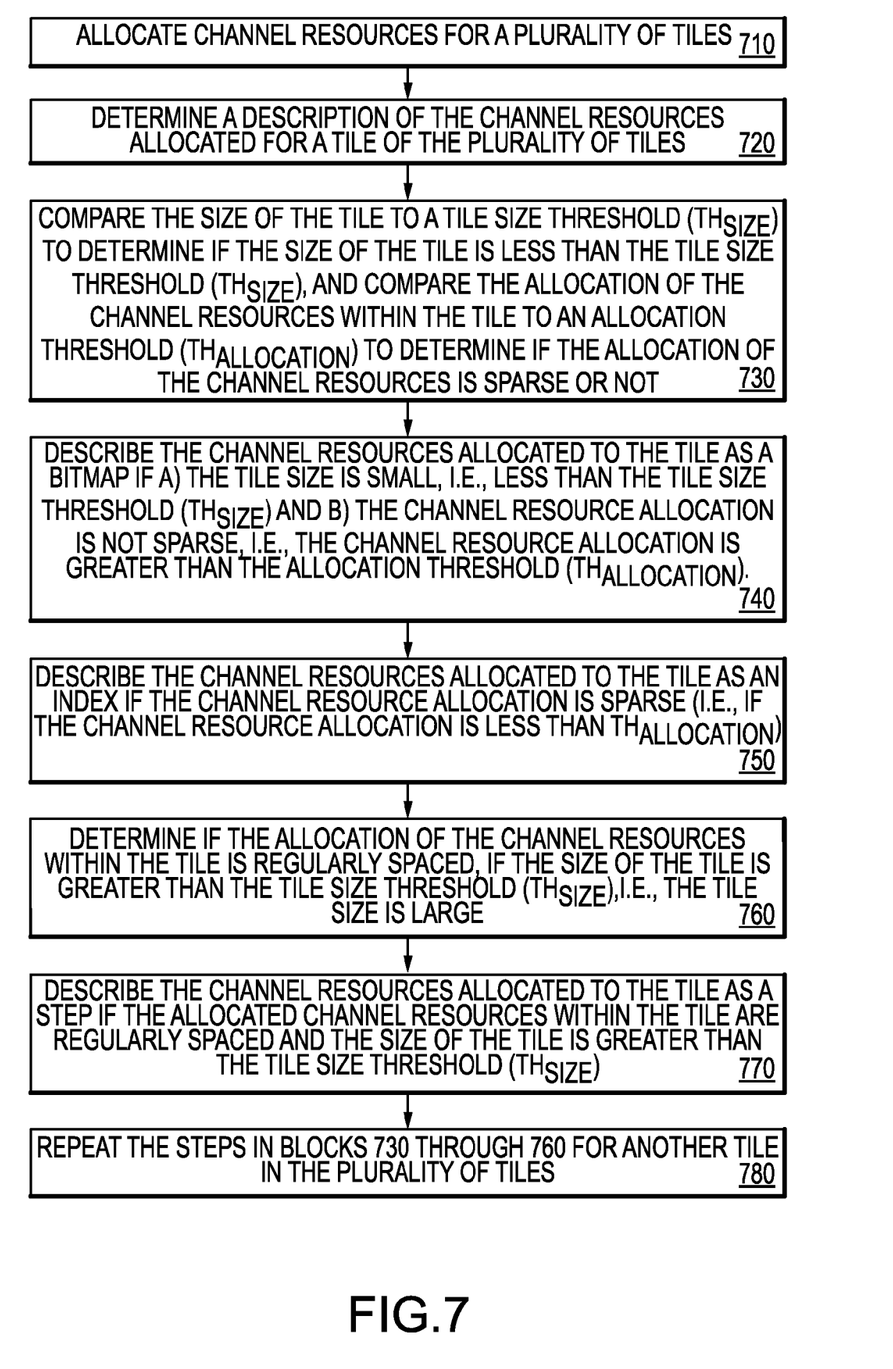
FIG. 7 illustrates an example flow diagram for channel resource description.

FIG. 7 illustrates an example flow diagram for channel resource description. In block 710, allocate channel resources for a plurality of tiles. In one aspect, the channel resources are time-frequency resources. Following block 710, in block 720, determine a description of the channel resources allocated for a tile of the plurality of tiles. In one aspect, the description is determined by the size of the tile, the allocation of the channel resources and/or spacing as described herein. Following block 720, in block 730, compare the size of the tile to a tile size threshold ($TH_{size}$) to determine if the size of the tile is less than a tile size threshold ($TH_{size}$). That is, compare the size of the tile to a tile size threshold ($TH_{size}$) to determine if the size of the tile is small or large. In one aspect, the tile size threshold ($TH_{size}$) is set a priori for the plurality of tiles. One skilled in the art would understand that the value of the tile size threshold ($TH_{size}$) may depend on various factors, such as but not limited to, application, usage, designer and operator choice, etc. without affecting the spirit and scope of the present disclosure. The value of the tile size threshold ($TH_{size}$) is chosen to define whether the size of the tile is small or large depending on factors such as application, usage, designer and operator choice, etc.

Also in block 730, compare the allocation of the channel resources within the tile to an allocation threshold ($TH_{allocation}$) to determine if the allocation of the channel resources is sparse or not sparse. One skilled in the art would understand that the value of the allocation threshold ($TH_{allocation}$) may depend on various factors, such as but not limited to, application, usage, designer and operator choice, etc. without affecting the spirit and scope of the present disclosure. The value of the allocation threshold ($TH_{allocation}$) is chosen to define whether the allocation of the channel resources is sparse or not sparse depending on factors such as application, usage, designer and operator choice, etc.

Following block 730, in block 740, describe the channel resources allocated to the tile as a bitmap if it is determined that a) the tile size is small, i.e., less than the tile size threshold ($TH_{size}$) and b) the channel resource allocation is not sparse, i.e., the channel resource allocation is greater than the allocation threshold ($TH_{allocation}$).

In block 750, describe the channel resources allocated to the tile as an index if it is determined that the channel resource allocation is sparse (i.e., if the channel resource allocation less than $TH_{allocation}$). In one aspect, the description of the channel resources allocated to the tile as an index is independent of the size of the tile. That is, the description as an index is regardless of whether the size of the tile is greater than, equal or less than the tile size threshold ($TH_{size}$). Herein, the channel resource description comprises the indices of the allocated tones for each symbol.

In block 760, if it is determined that the size of the tile is greater than the tile size threshold ($TH_{size}$), i.e., the tile size is large, then proceed to determine if the allocation of the channel resources within the tile are regularly spaced. Following block 760, in block 770, describe the channel resources allocated to the tile as a step if the allocated channel resources within the tile are regularly spaced. In one aspect, each symbol within the tile can be described by $t_n = t_0 + K*n$, where, $t_n$ is nth tone index in tile allocated to the channel; to is the starting tone index; K is the tone spacing; and n is tone index.

Following block 770, in block 780, repeat the steps in blocks 730 through 760 for another tile in the plurality of tiles.

One skilled in the art would understand that the steps disclosed in the example flow diagram in FIG. 7 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 8:
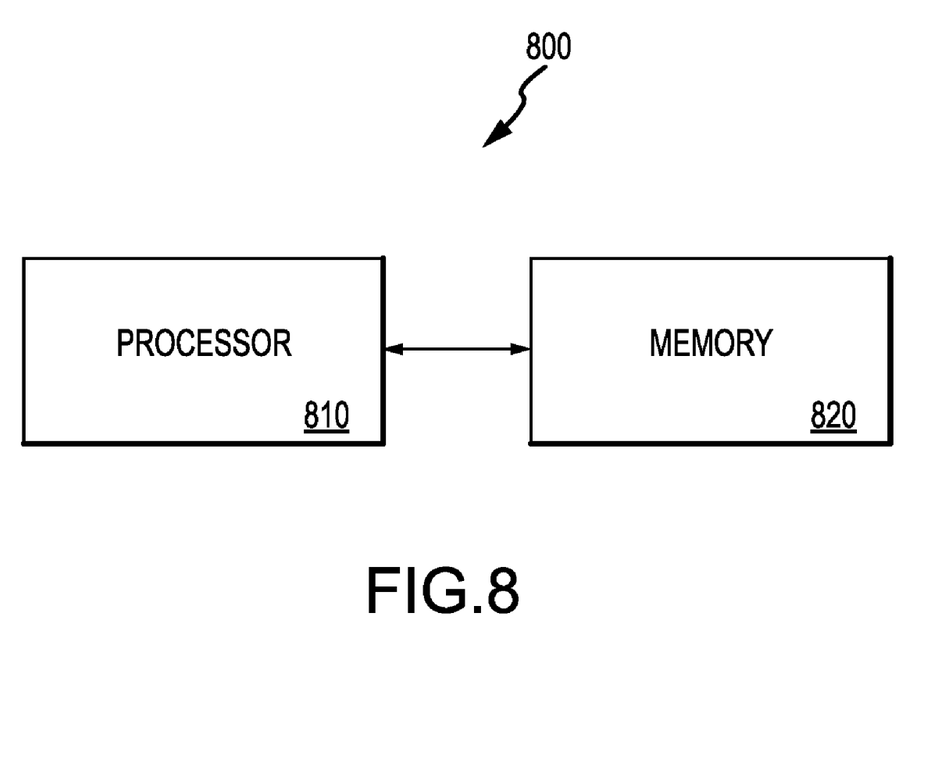
FIG. 8 illustrates an example of a device comprising a processor in communication with a memory for executing the processes for channel resource description.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 8 illustrates an example of a device 800 comprising a processor 810 in communication with a memory 820 for executing the processes for channel resource description. In one example, the device 800 is used to implement the algorithm illustrated in FIG. 7. In one aspect, the memory 820 is located within the processor 810. In another aspect, the memory 820 is external to the processor 810. In one aspect, the processor includes circuitry for implementing or performing the various flow diagrams, logical blocks and/or modules described herein.

Figure 9:
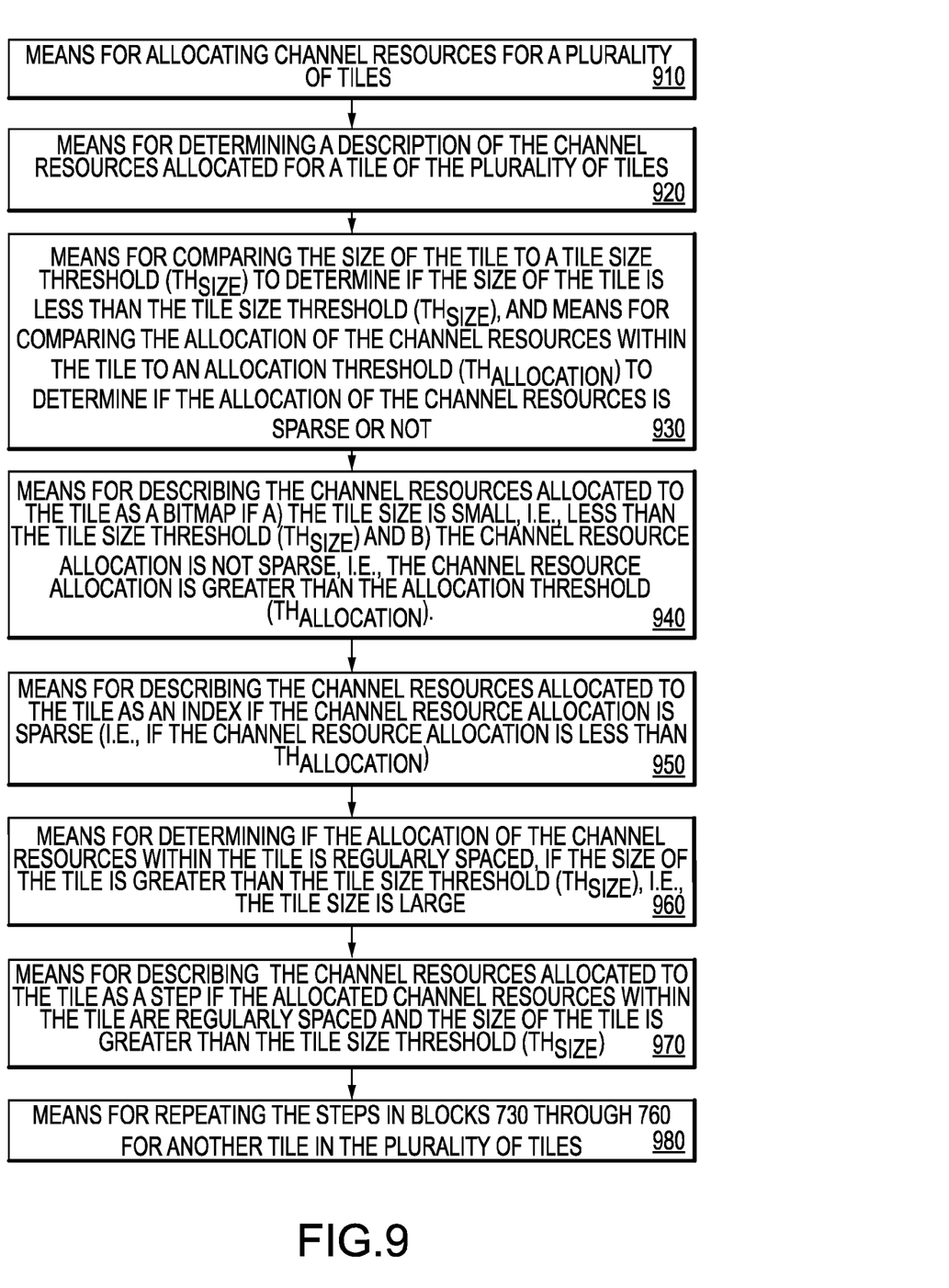
FIG. 9 illustrates an example of a device suitable for channel resource description.

FIG. 9 illustrates an example of a device 900 suitable for channel resource description. In one aspect, the device 900 is implemented by at least one processor comprising one or more modules configured for channel resource description as described herein in blocks 910, 920, 930, 940, 950, 960, 970 and 980. For example, each module comprises hardware, firmware, software, or any combination thereof. In one aspect, the device 900 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for describing channel resources comprising:
    allocating channel resources for a plurality of tiles; and
    determining a description of the channel resources allocated for a tile of the plurality of tiles by performing one or more of the following steps with a data processor:
    a) comparing the size of the tile to a tile size threshold ($TH_{size}$) to determine if the size of the tile is small or large;
    b) comparing the allocation of the channel resources to the tile to an allocation threshold ($TH_{allocation}$) to determine if the allocation of the channel resources is sparse or not sparse; and
    c) determining if the allocation of the channel resources within the tile is regularly spaced or not regularly spaced.

2. The method of claim 1 further comprising describing the channel resources allocated to the tile as a bitmap if the size of the tile is less than the tile size threshold ($TH_{size}$) and the allocation of the channel resources to the tile is greater than the allocation threshold ($TH_{allocation}$).

3. The method of claim 2 further comprising choosing another tile different from the plurality of tiles and repeating the determining the description of the channel resources step of claim 1 on the another tile.

4. The method of claim 1 further comprising describing the channel resources allocated to the tile as an index to yield a channel resource description if the channel resource allocation is less than the allocation threshold ($TH_{allocation}$).

5. The method of claim 4 wherein the channel resource description comprises a plurality of indices of allocated tones for each symbol.

6. The method of claim 5 further comprising choosing another tile different from the plurality of tiles and repeating the determining the description of the channel resources step of claim 1 on the another tile.

7. The method of claim 6 wherein the step of describing the channel resources allocated to the tile as an index is independent of the size of the tile.

8. The method of claim 1 further comprising describing the channel resources allocated to the tile as a step if the allocated channel resources within the tile are regularly spaced and the size of the tile is greater than the tile size threshold ($TH_{size}$).

9. The method of claim 8 wherein a symbol within the tile is described by an equation of $t_n = t_0 + K*n$, where $t_n$ is nth tone index in tile; $t_0$ is the starting tone index; K is the tone spacing; and n is tone index.

10. The method of claim 9 further comprising choosing another tile different from the plurality of tiles and repeating the determining the description of the channel resources step of claim 1 on the another tile.

11. The method of claim 1 wherein the channel resources are time-frequency resources.

12. The method of claim 11 further comprising choosing another tile different from the plurality of tiles and repeating the determining the description of the channel resources step of claim 1 on the another tile.

13. An apparatus for describing channel resources comprising:
- a processor coupled with a memory storing software codes, wherein the software codes are instructions implemented by the processor to:
- a) allocate channel resources for a plurality of tiles; and
- b) to determine a description of the channel resources allocated for a tile of the plurality of tiles by performing one or more of the following steps:
  - i) compare the size of the tile to a tile size threshold ($TH_{size}$) to determine if the size of the tile is small or large;
  - ii) compare the allocation of the channel resources to the tile to an allocation threshold ($TH_{allocation}$) to determine if the allocation of the channel resources is sparse or not sparse; and
  - iii) determine if the allocation of the channel resources within the tile is regularly spaced or not regularly spaced;
- an interface for exchanging information relating to the allocated channel resources.

14. The apparatus of claim 13 wherein the software codes further comprise instructions implemented by the processor to describe the channel resources allocated to the tile as a bitmap if the size of the tile is less than the tile size threshold ($TH_{size}$) and the allocation of the channel resources to the tile is greater than the allocation threshold ($TH_{allocation}$).

15. The apparatus of claim 14 wherein the software codes further comprise instructions implemented by the processor to choose another tile different from the plurality of tiles and to repeat the steps to determine the description of the channel resources on the another tile.

16. The apparatus of claim 13 wherein the software codes further comprise instructions implemented by the processor to describe the channel resources allocated to the tile as an index to yield a channel resource description if the channel resource allocation is less than the allocation threshold ($TH_{allocation}$).

17. The apparatus of claim 16 wherein the channel resource description comprises a plurality of indices of allocated tones for each symbol.

18. The apparatus of claim 17 wherein the software codes further comprise instructions implemented by the processor to choose another tile different from the plurality of tiles and to repeat the steps to determine the description of the channel resources on the another tile.

19. The apparatus of claim 13 wherein the software codes further comprise instructions implemented by the processor to describe the channel resources allocated to the tile as a step if the allocated channel resources within the tile are regularly spaced and the size of the tile is greater than the tile size threshold ($TH_{size}$).

20. The apparatus of claim 19 wherein a symbol within the tile is described by an equation of $t_n = t_0 + K*n$, where $t_n$ is nth tone index in tile; $t_0$ is the starting tone index; K is the tone spacing; and n is tone index.

21. The apparatus of claim 20 wherein the software codes further comprise instructions implemented by the processor to choose another tile different from the plurality of tiles and to repeat the steps to determine the description of the channel resources on the another tile.

22. The apparatus of claim 13 wherein the channel resources are time-frequency resources.

23. The apparatus of claim 22 wherein the software codes further comprise instructions implemented by the processor to choose another tile different from the plurality of tiles and to repeat the steps to determine the description of the channel resources on the another tile.

24. An apparatus for channel resource description comprising:
- means for allocating channel resources for a plurality of tiles; and
- means for determining a description of the channel resources allocated for a tile of the plurality of tiles by performing one or more of the following steps:
  - a) comparing the size of the tile to a tile size threshold ($TH_{size}$) to determine if the size of the tile is small or large;
  - b) comparing the allocation of the channel resources to the tile to an allocation threshold ($TH_{allocation}$) to determine if the allocation of the channel resources is sparse or not sparse; and
  - c) determining if the allocation of the channel resources within the tile is regularly spaced or not regularly spaced.

25. The apparatus of claim 24 further comprising means for describing the channel resources allocated to the tile as a bitmap if the size of the tile is less than the tile size threshold ($TH_{size}$) and the allocation of the channel resources to the tile is greater than the allocation threshold ($TH_{allocation}$).

26. The apparatus of claim 25 further comprising means for choosing another tile different from the plurality of tiles and repeating the steps performed by the means for determining the description of the channel resources on the another tile.

27. The apparatus of claim 24 further comprising means for describing the channel resources allocated to the tile as an index to yield a channel resource description if the channel resource allocation is less than the allocation threshold ($TH_{allocation}$).

28. The apparatus of claim 27 wherein the channel resource description comprises a plurality of indices of allocated tones for each symbol.

29. The apparatus of claim 28 further comprising means for choosing another tile different from the plurality of tiles and repeating the steps performed by the means for determining the description of the channel resources on the another tile.

30. The apparatus of claim 24 further comprising means for describing the channel resources allocated to the tile as a step if the allocated channel resources within the tile are regularly spaced and the size of the tile is greater than the tile size threshold ($TH_{size}$).

31. The apparatus of claim 30 wherein a symbol within the tile is described by an equation of $t_n = t_0 + K*n$, where $t_n$ is nth tone index in tile; $t_0$ is the starting tone index; K is the tone spacing; and n is tone index.

32. The apparatus of claim 31 further comprising means for choosing another tile different from the plurality of tiles and repeating the steps performed by the means for determining the description of the channel resources on the another tile.

33. The apparatus of claim 24 wherein the channel resources are time-frequency resources.

34. A non-transitory computer-readable medium having a computer program comprising instructions, which when executed by at least one processor provides channel resource description, the computer program comprising:
- instructions for allocating channel resources for a plurality of tiles; and
- instructions for determining a description of the channel resources allocated for a tile of the plurality of tiles by performing one or more of the following steps:
  - a) comparing the size of the tile to a tile size threshold ($TH_{size}$) to determine if the size of the tile is small or large;

b) comparing the allocation of the channel resources to the tile to an allocation threshold ($TH_{allocation}$) to determine if the allocation of the channel resources is sparse or not sparse; and c) determining if the allocation of the channel resources within the tile is regularly spaced or not regularly spaced.

35. The non-transitory computer-readable medium of claim 34 further comprising instructions for describing the channel resources allocated to the tile as a bitmap if the size of the tile is less than the tile size threshold ($TH_{size}$) and the allocation of the channel resources to the tile is greater than the allocation threshold ($TH_{allocation}$).

36. The non-transitory computer-readable medium of claim 35 further comprising instructions for choosing another tile different from the plurality of tiles and instructions for repeating the steps for determining the description of the channel resources on the another tile.

37. The non-transitory computer-readable medium of claim 34 further comprising instructions for describing the channel resources allocated to the tile as an index to yield a channel resource description if the channel resource allocation is less than the allocation threshold ($TH_{allocation}$).

38. The non-transitory computer-readable medium of claim 37 wherein the channel resource description comprises a plurality of indices of allocated tones for each symbol.

39. The non-transitory computer-readable medium of claim 38 further comprising instructions for choosing another tile different from the plurality of tiles and instructions for repeating the steps for determining the description of the channel resources on the another tile.

40. The non-transitory computer-readable medium of claim 34 further comprising instructions for describing the channel resources allocated to the tile as a step if the allocated channel resources within the tile are regularly spaced and the size of the tile is greater than the tile size threshold ($TH_{size}$).

41. The non-transitory computer-readable medium of claim 40 wherein a symbol within the tile is described by an equation of $t_n = t_0 + K*n$, where $t_n$ is nth tone index in tile; $t_0$ is the starting tone index; K is the tone spacing; and n is tone index.

42. The non-transitory computer-readable medium of claim 41 further comprising instructions for choosing another tile different from the plurality of tiles and instructions for repeating the steps for determining the description of the channel resources on the another tile.

43. The non-transitory computer-readable medium of claim 34 wherein the channel resources are time-frequency resources.

* * * * *